US009629027B2

(12) United States Patent  (10) Patent No.: US 9,629,027 B2
Dhanda et al.  (45) Date of Patent: Apr. 18, 2017

(54) METHOD TO PREVENT DATA STALLS DUE TO BLANKING IN MULTI-SIM MULTI-ACTIVE DEVICES

(71) Applicant: QUALCOMM Incorporated, San Diego, CA (US)

(72) Inventors: Mungal Singh Dhanda, Slough (GB); Neha Goel, Surrey (GB); Abeezar Burhan, Middlesex (GB); Hieu Trung Van, Kingston Upon Thames (GB); Divaydeep Sikri, Surrey (GB); Jafar Mohseni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 14/551,553

(22) Filed: Nov. 24, 2014

(65) Prior Publication Data

US 2016/0150568 A1  May 26, 2016

(51) Int. Cl.
    H04W 28/10      (2009.01)
    H04W 72/12      (2009.01)
    H04L 29/06      (2006.01)
    H04W 88/06      (2009.01)

(52) U.S. Cl.
    CPC ......... *H04W 28/10* (2013.01); *H04L 65/1066* (2013.01); *H04W 72/1215* (2013.01); *H04W 88/06* (2013.01)

(58) Field of Classification Search
    None
    See application file for complete search history.

(56) References Cited

U.S. PATENT DOCUMENTS

| 7,738,416 B2 | 6/2010 | Wandel |
| 9,258,413 B1* | 2/2016 | Sikri ................ H04W 72/1215 |
| 2007/0297435 A1* | 12/2007 | Bucknell ............ H04L 12/5693 370/412 |
| 2010/0279698 A1* | 11/2010 | Wong .................. H04W 88/06 455/450 |
| 2011/0002231 A1* | 1/2011 | Hole ................ H04W 72/1257 370/252 |
| 2012/0108273 A1* | 5/2012 | Lee ...................... H04W 68/02 455/458 |

(Continued)

FOREIGN PATENT DOCUMENTS

| CN | 101212813 A | 7/2008 |
| WO | 2012089596 A1 | 7/2012 |
| WO | 2012089634 A1 | 7/2012 |

OTHER PUBLICATIONS

International Search Report and Written Opinion—PCT/US2015/054464—ISA/EPO—Jan. 25, 2016.

(Continued)

*Primary Examiner* — Xavier Szewai Wong
(74) *Attorney, Agent, or Firm* — The Marbury Law Group, PLLC

(57) ABSTRACT

Various embodiments implemented on a multi-subscription-capable communication device (e.g., a mobile communication device capable of supporting more than one wireless subscription) enable a data connection for a blanked subscription to be kept alive during transmit (Tx) blanking by ensuring at least one Packet Data Traffic Channel (PDTCH) transmission is sent to the network before the network's counter for PDTCH transmissions expires.

28 Claims, 8 Drawing Sheets

(56) References Cited

U.S. PATENT DOCUMENTS

| | | |
|---|---|---|
| 2013/0012135 A1 | 1/2013 | Ruohonen et al. |
| 2013/0058298 A1* | 3/2013 | Xu ........................ H04W 48/16 |
| | | 370/329 |
| 2013/0136053 A1* | 5/2013 | Kim ...................... H04L 1/1812 |
| | | 370/312 |
| 2014/0213210 A1 | 7/2014 | Li et al. |
| 2014/0228070 A1* | 8/2014 | Josso .................... H04W 68/00 |
| | | 455/552.1 |
| 2014/0243037 A1 | 8/2014 | Sikri et al. |
| 2016/0095087 A1* | 3/2016 | Mohseni ............... H04W 72/02 |
| | | 455/558 |

OTHER PUBLICATIONS

Pecen, M. et al.: "Simultaneous Voice and Data Operation for GPRS/EDGE: Class A Dual Transfer Mode," IEEE Personal Communications, IEEE Communications Society, US, vol. 8, No. 2, Apr. 2001, pp. 14-49, XP002992040.

* cited by examiner

METHOD TO PREVENT DATA STALLS DUE TO BLANKING IN MULTI-SIM MULTI-ACTIVE DEVICES

BACKGROUND

Some new designs of mobile communication devices—such as smart phones, tablet computers, and laptop computers—include two or more Subscriber Identity Module ("SIM") cards that provide users with access to multiple separate mobile telephony networks. Examples of mobile telephony networks include GSM, TD-SCDMA, CDMA2000, LTE, and WCDMA. Example multi-SIM mobile communication devices include mobile phones, laptop computers, smart phones, and other mobile communication devices that are configured to connect to multiple mobile telephony networks. A mobile communication device that includes a plurality of SIMs and connects to two or more separate mobile telephony networks using two or more separate radio-frequency ("RF") transceivers is termed a "multi-SIM-multi-active" or "MSMA" communication device. An example MSMA communication device is a "dual-SIM-dual-active" or "DSDA" communication device, which includes two SIM cards/subscriptions associated with two mobile telephony networks.

Because a multi-SIM-multi-active communication device has a plurality of separate RF communication circuits or "RF resources," each subscription on the multi-SIM-multi-active communication device may use its associated RF resource to communicate with its mobile network at any time. However, in certain band-channel combinations of operation, the simultaneous use of the RF resources may cause one or more RF resources to desensitize or interfere with the ability of the other RF resources to operate normally because of the proximity of the antennas of the RF chains included in the multi-SIM-multi-active communication device.

To address the issues presented by desensitization or interference, in current DSDA devices if there is a co-existence or transmit (Tx)-receive (Rx)/Tx-Tx conflict when one subscription is performing data transfer and the other subscription is in a voice call or performing any signaling procedures, the subscription doing data transfer is assigned lower priority and its transmissions will be blanked (i.e., Tx blanking) to prevent performance degradation of the other subscription. However, Tx blanking often leads to data stalls/timeouts and abnormal temporary block flow (TBF) releases for the blanked subscription.

The problem arises because the network stops assigning Uplink State Flags (USFs) if the network does not receive any data blocks from the DSDA device for a certain duration as described in 3rd Generation Partnership Project (3GPP) Technical Specification (TS) 44.060. Thus, when Packet Data Traffic Channel (PDTCH) transmissions are not transmitted for the data transferring subscription due to the higher priority activity of the other subscription for longer than the specified duration, the network stops scheduling Radio Link Control (RLC)/Medium Access Control (MAC) blocks from the DSDA device for the assigned USF. In many networks, a counter is incremented to track whether the certain duration has been exceeded. When data is received for a USF, the counter is reset. For most networks, the value of the counter is slightly more than 8 (resulting in a certain duration of 400 ms).

SUMMARY

Various embodiments provide methods, devices, and non-transitory processor-readable storage media for keeping a data connection for a blanked subscription alive during transmit (Tx) blanking by ensuring at least one Packet Data Traffic Channel (PDTCH) transmission is sent to the network before the network's counter for PDTCH transmissions expires.

Some embodiment methods may include determining whether a traffic channel (TCH) transmission for a first subscription in a voice call will collide with a Packet Data Traffic Channel (PDTCH) transmission for a second subscription in a data call, transmitting the TCH transmission for the first subscription and blanking the PDTCH transmission in response to determining that the TCH transmission for the first subscription in the voice call will collide with the PDTCH transmission for the second subscription in the data call, incrementing a blanking counter in response to blanking the PDTCH transmission, determining whether the blanking counter is greater than or equal to a blanking threshold in response to incrementing the blanking counter, and transmitting a next PDTCH transmission for the second subscription in response to determining that the blanking counter is greater than or equal to the blanking threshold. In some embodiments, transmitting a next PDTCH transmission for the second subscription in response to determining that the blanking counter is greater than or equal to the blanking threshold may include momentarily increasing a priority assigned to the second subscription until the next PDTCH transmission is transmitted. In some embodiments, the blanking threshold may be equal to a maximum number of consecutive PDTCH transmissions that can be blanked before taking a corrective action. In some embodiments, the corrective action may be prioritizing the next PDTCH transmission over a next TCH transmission.

Some embodiment methods may include determining an Uplink State Flag (USF) utilization rate in response to transmitting the next PDTCH transmission for the second subscription. In some embodiments, determining the USF utilization rate in response to transmitting the next PDTCH transmission for the second subscription may include determining the USF utilization rate based on a number of USFs allocated to the mobile communication device and a number of PDTCH transmissions transmitted from the mobile communication device.

Some embodiment methods may include determining whether the USF utilization rate is greater than or equal to a radio link threshold, and applying flow control to the data call in response to determining that the USF utilization rate is greater than or equal to the radio link threshold.

Some embodiment methods may include determining whether the USF utilization rate is less than or equal to a radio resource threshold, and reducing a multislot class for the data call in response to determining that the USF utilization rate is less than or equal to the radio resource threshold. In some embodiments, reducing the multislot class for the data call may include reducing the multislot class to a single slot transmit.

Various embodiments may include a multi-subscription-capable communication device configured with processor-executable instructions to perform operations of the methods described above.

Various embodiments may include a multi-subscription-capable communication device having means for performing functions of the operations of the methods described above.

Various embodiments may include non-transitory processor-readable media on which are stored processor-executable instructions configured to cause a processor of a multisubscription-capable communication device to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
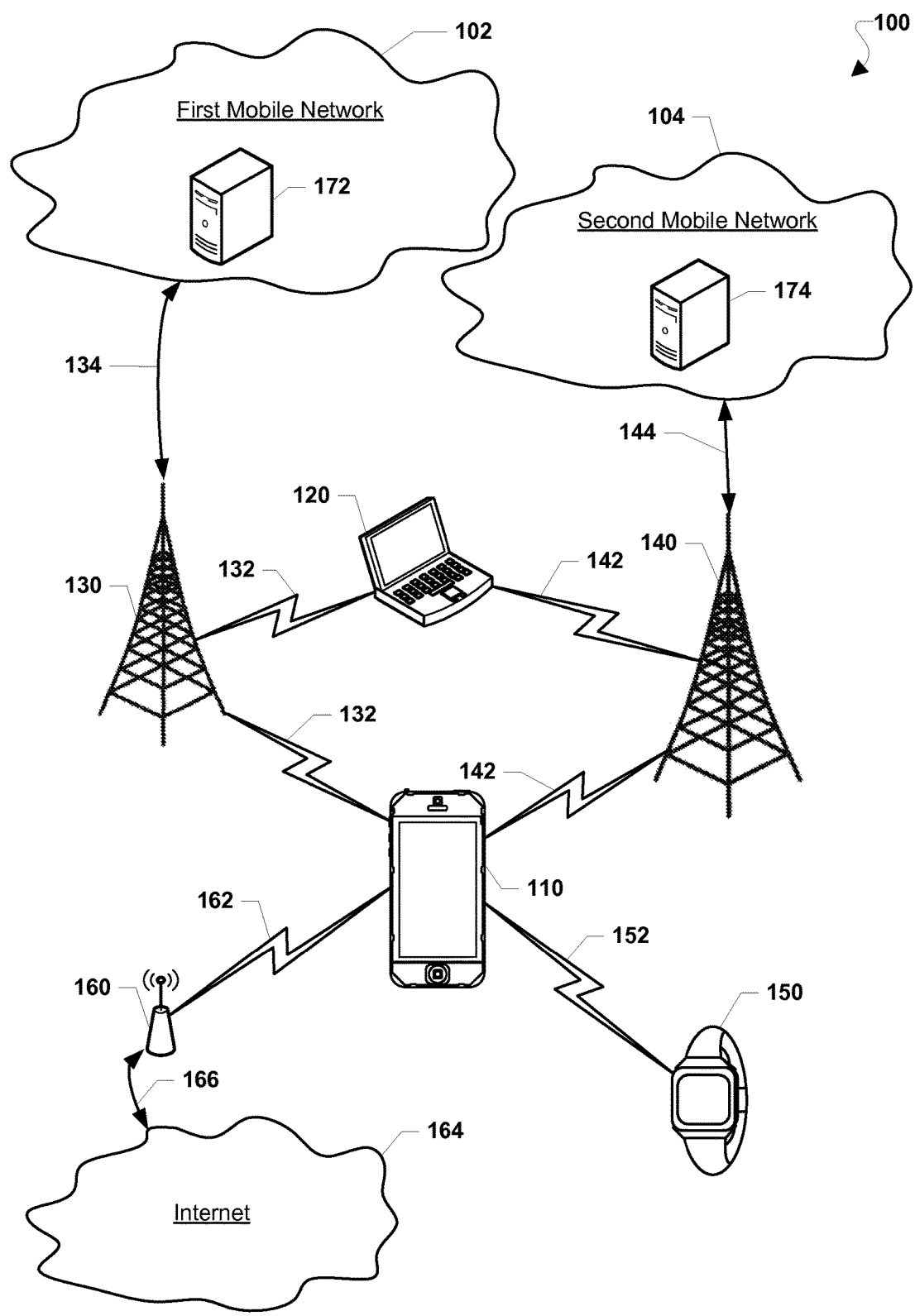
FIG. 1 is a communication system block diagram of mobile telephony networks suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments include methods of managing communications by two or more subscriptions on a multi-subscription-capable communication device that ensures enough transmissions are made by a lower-priority subscription (i.e., a subscription that is subject to blanking) keep a data connection alive.

As used herein, the terms "wireless device," "mobile communication device," "multi-subscription-capable communication device," and "multi-SIM-multi-active communication device" are used interchangeably and refer to any one or all of cellular telephones, smart phones, personal or mobile multi-media players, personal data assistants, laptop computers, personal computers, tablet computers, smart books, palm-top computers, wireless electronic mail receivers, multimedia Internet-enabled cellular telephones, wireless gaming controllers, and similar personal electronic devices that include a programmable processor, memory, and circuitry for connecting to at least two mobile communication networks. The various aspects may be useful in mobile communication devices, such as smart phones, and so such devices are referred to in the descriptions of various embodiments. However, the embodiments may be useful in any electronic devices, such as a DSDA communication device, that may individually maintain a plurality of subscriptions that utilize a plurality of separate RF resources.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "SIM" is also be used herein as a shorthand reference to the communication service associated with and enabled by the information stored in a particular SIM as the SIM and the communication network, as well as the services and subscriptions supported by that network, correlate to one another.

As described, one or more subscriptions on a multi-SIM-multi-active communication device may negatively affect the performance of other subscriptions operating on the multi-SIM-multi-active communication device. For example, a dual-SIM-dual-active communication device may suffer from intra-device interference when a first subscription is attempting to transmit during an active voice call while a second subscription in the dual-SIM-dual-active communication device is simultaneously attempting to transmit in a data call. During such a "coexistence event," the first subscription's transmissions may cause severe impairment to (also referred to as "collisions" with) the second subscription's ability to transmit data packets. This interference may be in various forms, such as blocking interference, harmonics, intermodulation, other noises and distortion issues, etc.

Currently, a solution to the issues presented by collisions or desensitization during coexistence events employed in current DSDA devices is that response to there being a co-existence or transmit (Tx)-receive (Rx)/Tx-Tx conflict when the second subscription is performing data transfer and the first subscription is in a voice call or performing any signaling procedures, the second subscription doing data transfer is assigned lower priority and its transmissions will be blanked (i.e., Tx blanking) to prevent performance degradation of the first subscription. However, Tx blanking may lead to data stalls/timeouts and abnormal temporary block flow (TBF) releases for the blanked subscription.

This may occur because the network stops assigning Uplink State Flags (USFs) when the network does not receive any data blocks from the DSDA device for a certain duration as described in 3rd Generation Partnership Project (3GPP) Technical Specification (TS) 44.060. Thus, when Packet Data Traffic Channel (PDTCH) transmissions are not transmitted for the data transferring second subscription for longer than the specified duration, the network stops scheduling Radio Link Control (RLC)/Medium Access Control (MAC) blocks from the DSDA device for the assigned USF. In many networks, a counter is incremented to track whether the certain duration has been exceeded. For example, the network may increment the N3101 counter for each USF for which no data is received from the corresponding TBF. When data is received for a USF, the counter is reset. When data is not received for a USF and the counter reaches its maximum value, the network stops assigning USFs for the mobile communication device.

To overcome this, the various embodiments implemented on a mobile communication device (e.g., a multi-subscription-capable communication device) keep a data connection for a blanked subscription alive during Tx blanking by ensuring that at least one PDTCH transmission is sent to the network before the network's counter for PDTCH transmissions expires. In various embodiments, a processor of the mobile communication device may increment a PDTCH blanking counter as PDTCH transmissions are blanked during Tx blanking of a subscription. When the PDTCH blanking counter is equal to or greater than a blanked packet threshold, the processor of the mobile communication device ensures that a next PDTCH transmission is transmitted to its network. In this manner, the network may receive a PDTCH transmission from the mobile communication device before the network's counter, such as the N3101 counter, reaches its maximum value, thereby preventing the network from stopping USF allocation and reducing the likelihood of data stalls for the blanked subscription.

In various embodiments, a GSM/Edge Radio Access Network (GERAN) layer operating on a processor of a mobile communication device (e.g., a multi-subscription-capable communication device) may determine whether there is a collision between a first subscription in a high priority voice call's traffic channel (TCH) transmissions and a second subscription in a low priority data call's PDTCH transmissions. In response to determining that there is a collision, the GERAN layer may transmit the TCH transmissions for the first subscription and blank the PDTCH transmission for the second subscription. As PDTCH transmissions for the second subscription are blanked, the GERAN layer may increment a blanking counter, and determine whether the blanking counter is greater than or equal to a blanking threshold. In some embodiments, the blanking threshold may be equal to a maximum number of consecutive PDTCH transmissions that may be blanked before taking a corrective action. As an example, the blanking threshold may be sixteen packets. In response to determining that the blanking counter is at or above the blanking threshold, the GERAN layer may prioritize the next PDTCH transmission on the second subscription for transmission and transmit the next PDTCH transmission (see e.g., FIG. 5). In this manner, the network may receive a PDTCH transmission from the mobile communication device before the network's counter, such as the N3101 counter, reaches its maximum value, thereby preventing the network from stopping USF allocation. After sending a PDTCH transmission, the GERAN layer may reset the blanking counter and repeat the process.

In various embodiments, the GERAN layer operating on a processor of a mobile communication device (e.g., a multi-subscription-capable communication device) may be in communication with a Radio Link Control (RLC) function and a Radio Resource (RR) sublayer of operating on the same or different processor of the mobile communication device. The GERAN layer may determine a USF utilization rate. In various embodiments, the USF utilization rate may be determined based on the number of USFs assigned to the mobile communication device and the number of PDTCH transmissions transmitted from the mobile communication device. In various embodiment, the GERAN layer may send the USF utilization rate to the RLC function and the RR sublayer (see e.g., FIG. 4).

Figure 6:
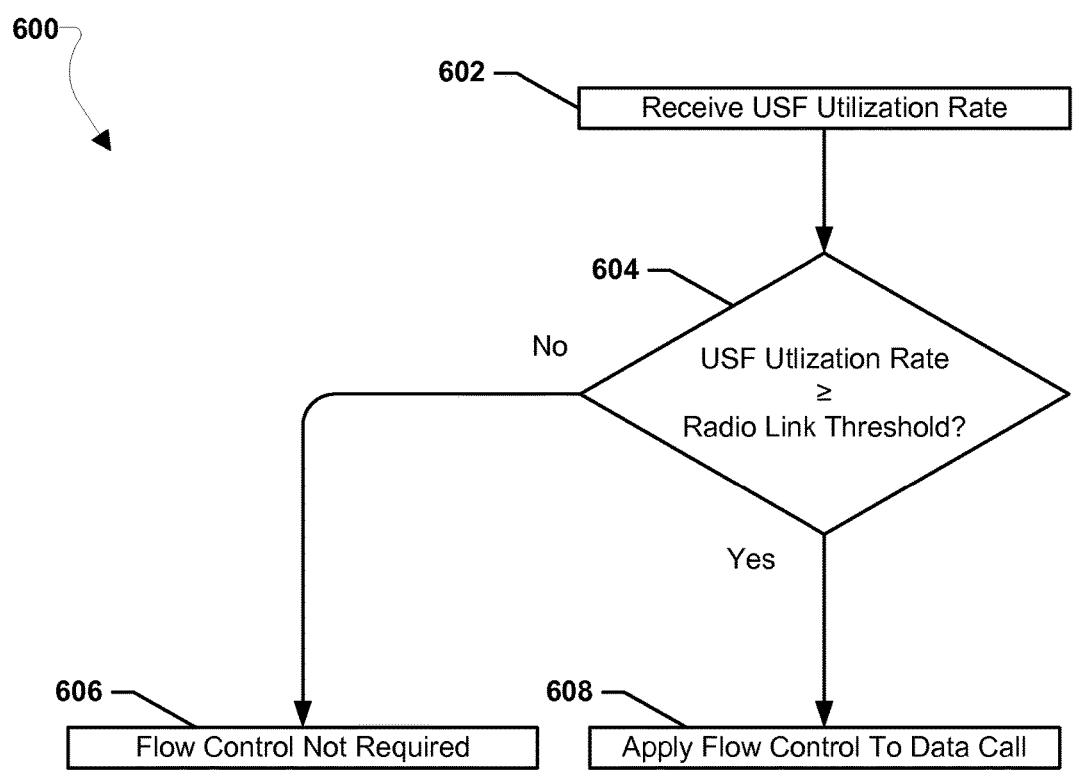
FIG. 6 is a process flow diagram illustrating a method for applying flow control to a data call based on a USF utilization rate according to various embodiments.

In various embodiments, the RLC function operating on a processor of a mobile communication device (e.g., a multi-subscription-capable communication device) may determine whether the USF utilization rate is at or above a radio link threshold and may apply flow control on the data connection in response to the USF utilization rate being at or above the radio link threshold (see e.g., FIG. 6).

In various embodiments, the RR sublayer operating on a processor of a mobile communication device (e.g., a multi-subscription-capable communication device) may determine whether the USF utilization rate is at or below a radio resource threshold, and may reduce the multislot class of the data connection of the mobile communication device in response to the USF utilization rate being at or below the radio resource threshold (see e.g., FIG. 7). For example, the RR sublayer may reduce the number of slots assigned to PDTCH transmissions from a normal amount, such as four slots, to a single slot in response to the USF utilization rate being at or below the radio resource threshold. Reducing the multislot class may enable the mobile communication device to support fewer slots in the uplink, thereby reducing the rate of Tx-Tx or Tx-Rx collisions. The reduction of slots may improve radio resource usage because slots that would otherwise be unused during PDTCH transmission blanking may be released for usage.

Various embodiments may be implemented within a variety of communication systems 100 that include at least two mobile telephony networks, an example of which is illustrated in FIG. 1. A first mobile network 102 and a second mobile network 104 typically each include a plurality of cellular base stations (e.g., a first base station 130 and a second base station 140). A first mobile communication device 110 may be in communication with the first mobile network 102 through a cellular connection 132 to the first base station 130. The first mobile communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second mobile communication device 120 may similarly communicate with the first mobile network 102 through the cellular connection 132 to the first base station 130. The second mobile communication device 120 may communicate with the second mobile network 104 through the cellular connection 142 to the second base station 140. The cellular connections 132 and 142 may be made through two-way wireless communication links, such as 4G, 3G, CDMA, TDMA, WCDMA, GSM, and other mobile telephony communication technologies.

While the mobile communication devices 110, 120 are shown connected to the mobile networks 102, 104, in some embodiments (not shown), the mobile communication devices 110, 120 may include one or more subscriptions to two or more mobile networks 102, 104 and may connect to those networks in a manner similar to operations described above.

In some embodiments, the first mobile communication device 110 may establish a wireless connection 152 with a peripheral device 150 used in connection with the first mobile communication device 110. For example, the first mobile communication device 110 may communicate over a Bluetooth® link with a Bluetooth-enabled personal computing device (e.g., a "smart watch"). In some embodiments, the first mobile communication device 110 may establish a wireless connection 162 with a wireless access point 160, such as over a Wi-Fi connection. The wireless access point 160 may be configured to connect to the Internet 164 or another network over a wired connection 166.

While not illustrated, the second mobile communication device 120 may similarly be configured to connect with the peripheral device 150 and/or the wireless access point 160 over wireless links.

In some embodiments, the first mobile network 102 and the second mobile network 104 may individual include at least one server (e.g., a server 172 and a server 174, respectively) that may be configured to assign USFs and track received PDTCH transmissions from the mobile communication devices 110, 120 as described in 3GPP TS 44.060.

Figure 2:
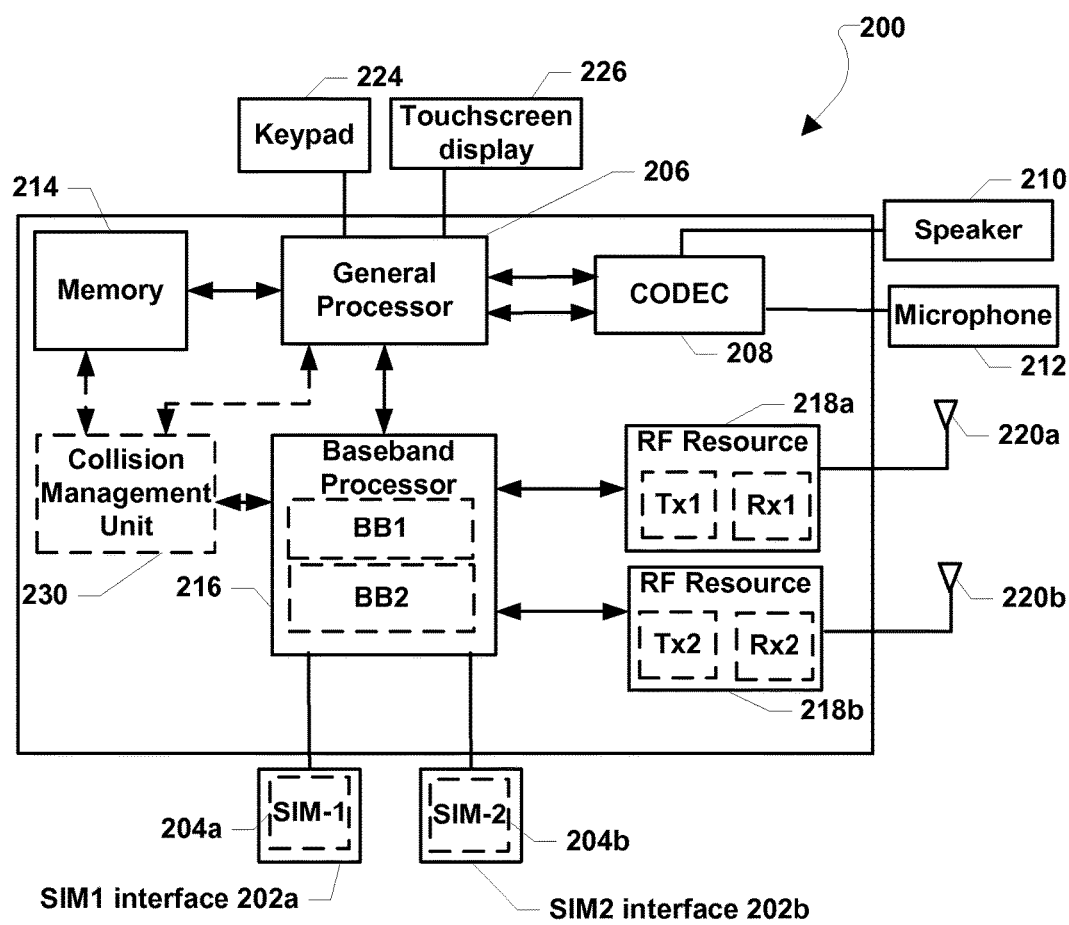
FIG. 2 is a component block diagram of a multi-SIM-multi-active communication device according to various embodiments.

FIG. 2 is a functional block diagram of a mobile communication device 200 suitable for implementing various embodiments. According to various embodiments, the mobile communication device 200 may be similar to one or more of the mobile communication devices 110, 120 as described with reference to FIG. 1. With reference to FIGS. 1 and 2, the mobile communication device 200 may include a first SIM interface 202a, which may receive a first identity module SIM-1 204a that is associated with a first subscription. The mobile communication device 200 may also include a second SIM interface 202b, which may receive a second identity module SIM-2 204b that is associated with a second subscription.

A SIM in various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM, and I/O circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number is printed on the SIM card for identification. However, a SIM may be implemented within a portion of memory of the mobile communication device 200 (e.g., memory 214), and thus need not be a separate or removable circuit, chip or card.

The mobile communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data, such as an array data structure. In some embodiments, the memory 214 may also store one or more look-up tables, lists, or various other data structures that may be referenced to determine whether collisions are detected, determine the status of counters, determine USF utilization rates, compare values to thresholds, etc. (see e.g., FIGS. 5-7).

The general processor 206 and the memory 214 may each be coupled to at least one baseband modem processor 216. Each SIM in the mobile communication device 200 (e.g., the SIM-1 204a and the SIM-2 204b) may be associated with a baseband-RF resource chain. The baseband-RF resource chain may include the baseband modem processor 216, which may perform baseband/modem functions for communicating with/controlling a radio access technology (RAT), and may include one or more amplifiers and radios, referred to generally herein as RF resources (e.g., RF resources 218a, 218b). In some embodiments, baseband-RF resource chains may share the baseband modem processor 216 (i.e., a single device that performs baseband/modem functions for all SIMs on the mobile communication device 200). In other embodiments, each baseband-RF resource chain may include physically or logically separate baseband processors (e.g., BB1, BB2).

In some embodiments, the RF resources 218a, 218b may be associated with different SIMs/subscriptions. For example, a first subscription to a WCDMA network may be associated with the RF resource 218a, and a second subscription to a GSM network may be associated with the RF resource 218b. The RF resources 218a, 218b may each be transceivers that perform transmit/receive functions on behalf of their respective subscriptions/SIMs. The RF resources 218a, 218b may also include separate transmit and receive circuitry, or may include a transceiver that combines transmitter and receiver functions. The RF resources 218a, 218b may each be coupled to a wireless antenna (e.g., a first wireless antenna 220a or a second wireless antenna 220b). The RF resources 218a, 218b may also be coupled to the baseband modem processor 216. In some embodiments, the mobile communication device 200 may be a dual-Tx DSDA communication device having two transmit functions and two receive functions. For example, the mobile communication device may be a dual-Tx DSDA communication device with both RF resources 218a and 218b being transceivers or including separate transmit and receive circuitry. In such an example dual-Tx DSDA communication device, RF resources 218a and 218b may each be associated with different SIMs/subscriptions. In some embodiments, the mobile communication device 200 may be a single-Tx DSDA communication device having a single transmit function and two receive functions. For example, the mobile communication device 200 may be a single-Tx DSDA communication device with one RF resource 218a being a transceiver or including separate transmit and receive circuitry and the other RF resource 218b including only receive circuitry. In such an example single-Tx DSDA communication device, different SIMs/subscriptions may receive via different respective RF resources 218a or 218b, but the different SIMs/subscriptions may transmit via the same single-RF resource 218a having the single transmit function.

In some embodiments, the general processor 206, the memory 214, the baseband processor(s) 216, and the RF resources 218a, 218b may be included in the mobile communication device 200 as a system-on-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the mobile communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the mobile communication device 200 to enable communication between them, as is known in the art.

Functioning together, the two SIMs 204a, 204b, the baseband modem processor 216, the RF resources 218a, 218b, and the wireless antennas 220a, 220b may constitute two or more RATs. For example, a SIM, baseband processor and RF resource may be configured to support a GSM RAT, an LTE RAT, and/or a WCDMA RAT. More RATs may be supported on the mobile communication device 200 by adding more SIM cards, SIM interfaces, RF resources, and/or antennae for connecting to additional mobile networks.

The mobile communication device 200 may include a collision management unit 230 configured to manage and/or schedule the subscriptions' utilization of the RF resources 218a, 218b, such as by implementing Tx blanking on transmissions sent via a subscription in a data call while another subscription is in an active voice call. In some embodiments, the collision management unit 230 may be implemented within the general processor 206. In some embodiments, the collision management unit 230 may be implemented as a separate hardware component (i.e., separate from the general processor 206). In some embodiments, the collision management unit 230 may be implemented as a software application stored within the memory 214 and executed by the general processor 206 or another processor (e.g., a modem processor or the baseband processor 216).

Figure 3:
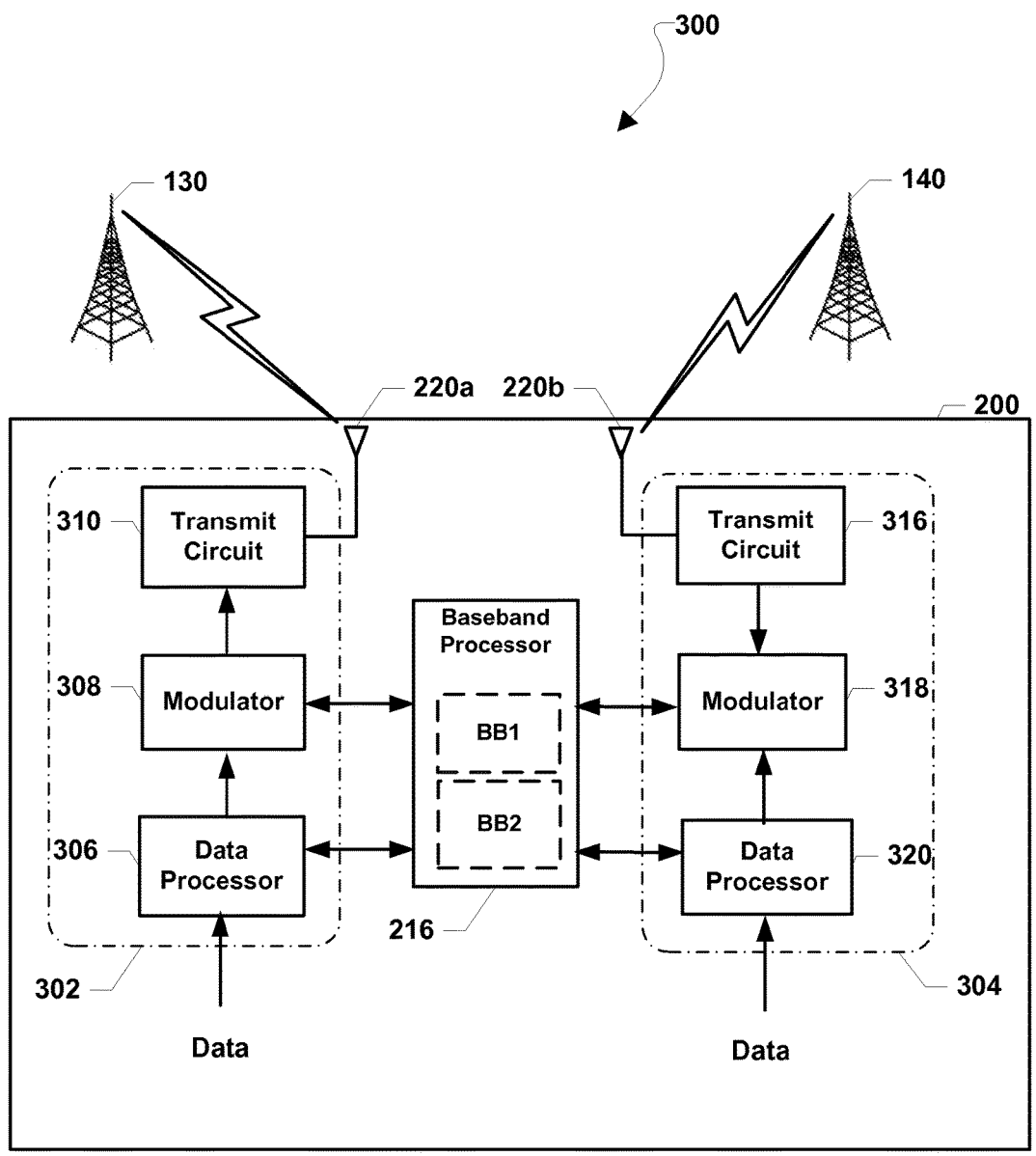
FIG. 3 is a component block diagram illustrating the interaction between components of different transmit/receive chains in a multi-SIM-multi-active communication device according to various embodiments.

FIG. 3 is a block diagram 300 of transmit and receive components in separate RF resources on the mobile communication device 200 described with reference to FIG. 2, according to various embodiments. With reference to FIGS. 1-3, a transmitter 302 may be part of the RF resource 218a, and a transmitter 304 may be part of the RF resource 218b. In some embodiments, the transmitter 302 may include a data processor 306 that may format, encode, and interleave data to be transmitted. The transmitter 302 may include a modulator 308 that modulates a carrier signal with encoded data, such as by performing Gaussian minimum shift keying (GMSK). One or more transmit circuits 310 may condition the modulated signal (e.g., by filtering, amplifying, and upconverting) to generate an RF modulated signal for transmission. The RF modulated signal may be transmitted by the transmitter 302 to the first base station 130 via the first wireless antenna 220a, for example.

In some embodiments, the transmitter 304 may include a data processor 320 that may format, encode, and interleave data to be transmitted. The transmitter 304 may include a modulator 318 that modulates a carrier signal with encoded data, such as by performing Gaussian minimum shift keying (GMSK). One or more transmit circuits 316 may condition the modulated signal (e.g., by filtering, amplifying, and upconverting) to generate an RF modulated signal for transmission. The RF modulated signal may be transmitted by the transmitter 304 to the second base station 140 via the second wireless antenna 220b, for example.

The transmitters 302, 304 may both transmit RF modulated signals to their respective base stations 130, 140, when collisions between voice and data transmission from the two wireless antennas 220a and 220b, such as collisions between TCH transmissions and PDTCH transmissions, are determined to not occur. However, when voice and data transmissions from the two wireless antennas 220a and 220b, such as collisions between TCH transmissions and PDTCH transmissions, are detected, only one transmitter, such as the transmitter 302 or 304, may transmit RF modulated signals at a time to its respective base station 130 or 140. Operations of the transmitters 302, 304 may be controlled by a processor, such as the baseband modem processor 216.

In various embodiments, each of the transmitters 302, 304 may be implemented as circuitry that may be separated from their corresponding receive and transmit circuitries (not shown). Alternatively, the transmitters 302, 304 may be respectively combined with corresponding receive circuitry and transmit circuitry, for example, as transceivers associated with the SIM-1 204a and the SIM-2 204b.

Figure 4:
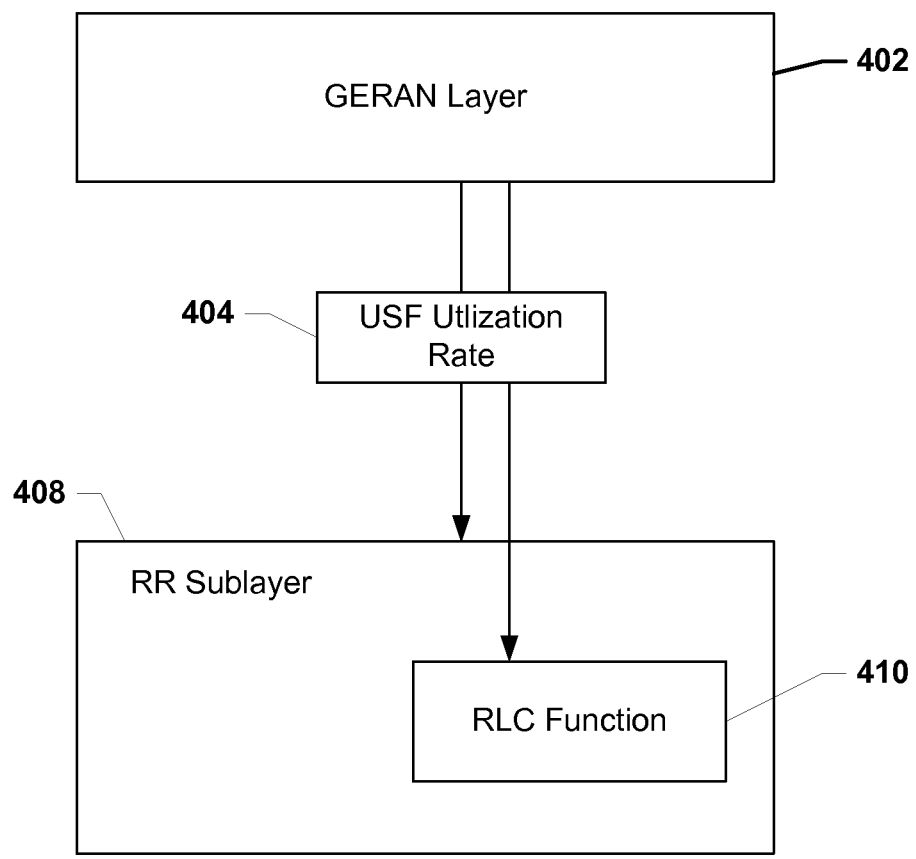
FIG. 4 is a block diagram illustrating interactions between layers of a multi-subscription-capable communication device according to some embodiments.

FIG. 4 is a block diagram illustrating interactions between layers of a multi-subscription-capable communication device (e.g., the mobile communication devices 110, 120, and 200 described with reference to FIGS. 1-3) according to some embodiments. The layers may include a GERAN layer 402 that may send information, such as a USF utilization rate 404, to a RR sublayer 408 and a RLC function 410 within the RR sublayer 408.

Figure 5:
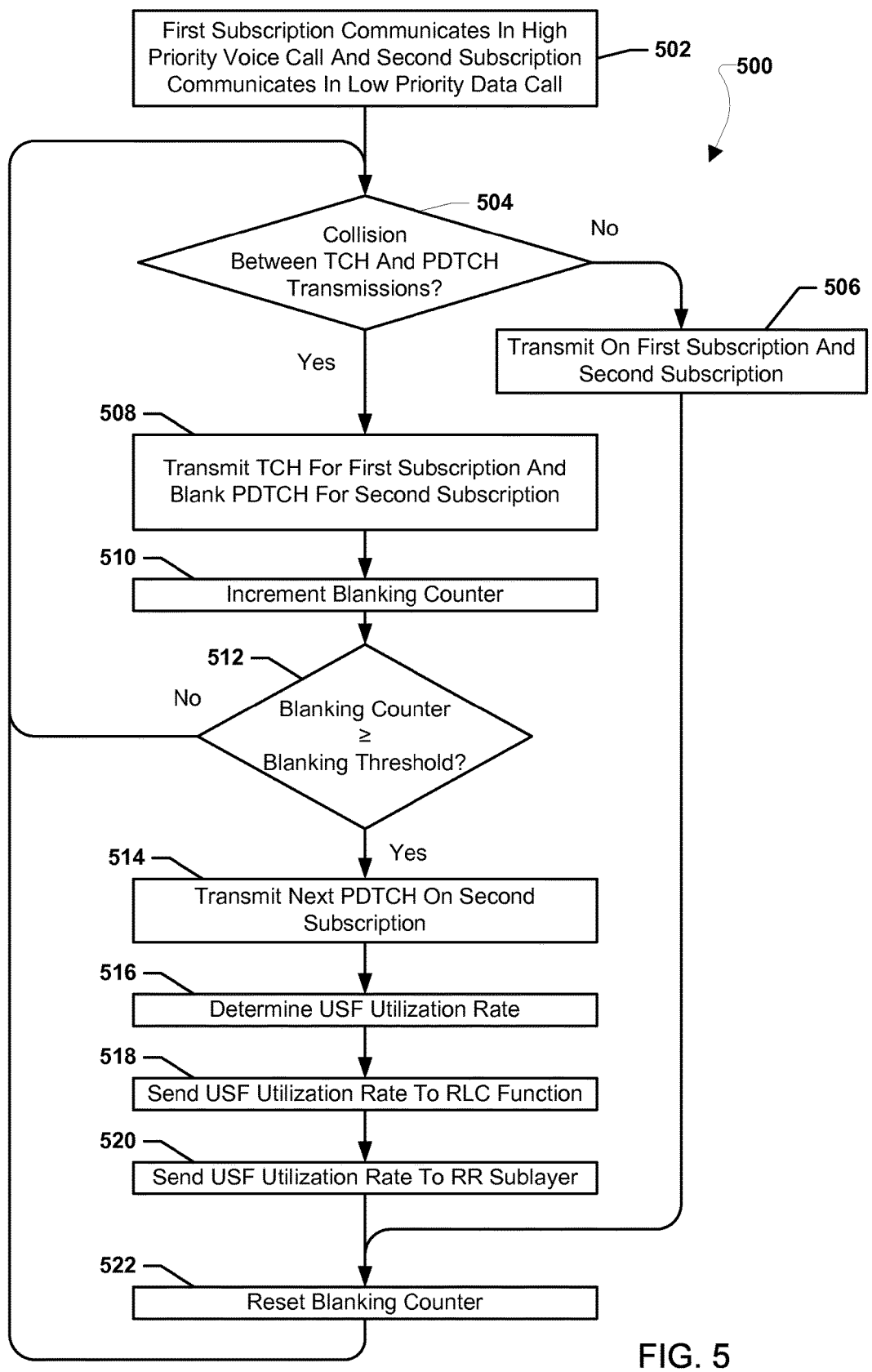
FIG. 5 is a process flow diagram illustrating a method for maintaining a data connection for a blanked subscription during Tx blanking according to various embodiments.

The GERAN layer 402 may determine the USF utilization rate 404 based on the number of USFs assigned to the mobile communication device and a number of PDTCH transmissions actually transmitted by the multi-subscription-capable communication device (see e.g., FIG. 5).

The RR sublayer 408 may determine whether the USF utilization rate 404 is at or below a radio resource threshold and may reduce the multislot class of a connection of the multi-subscription-capable communication device, such as a data connection, in response to the USF utilization rate 404 being at or below the radio resource threshold (see e.g., FIG. 7).

The RLC function 410 may determine whether the USF utilization rate 404 is at or above a radio link threshold and may apply flow control on a connection of the multi-subscription-capable communication device, such as a data connection in response to the USF utilization rate 404 being at or above the radio link threshold (see e.g., FIG. 6).

The GERAN layer 402, RR sublayer 408, and/or RLC function 410 may be implemented in a processor (e.g., the general processor 206 of FIG. 2, the baseband modem processor 216, the collision management unit 230, a separate controller, and/or the like) of a multi-subscription-capable communication device (e.g., the mobile communication devices 110, 120, 200 described with reference to FIGS. 1-3).

FIG. 5 illustrates a method 500 for keeping a data connection for a blanked subscription alive during Tx blanking according to various embodiments by ensuring at least one PDTCH transmission is sent to the network before the network's counter for PDTCH transmissions, such as the N3101 counter, reaches a maximum value. The method 500 may be implemented with a processor (e.g., the general processor 206 of FIG. 2, the baseband modem processor 216, the collision management unit 230, a separate controller, and/or the like) of a multi-subscription-capable communication device (e.g., the mobile communication devices 110, 120, 200 described with reference to FIGS. 1-4). For example, the method 500 may be implemented by or within a GERAN layer (e.g., GERAN layer 402 of FIG. 4).

With references to FIGS. 1-5, the device processor may begin performing operations of the method 500 when a first subscription is communicating in high priority voice call and a second subscription is communicating in a low priority data call (block 502). In some embodiments, the first subscription may be generating TCH transmissions for the voice call and the second subscription may be generating PDTCH transmissions for the data call. In determination block 504, the device processor may determine whether a collision between a TCH transmission by the first subscription and a PDTCH transmission of the second subscription will occur. In response to determining that the TCH transmissions and PDTCH transmissions will not collide (i.e., determination block 504="No"), the device processor may transmit on the first subscription and the second subscription in block 506. Thus, PDTCH transmissions of the second subscription are not blanked when no collision will occur.

In response to determining that the TCH transmissions and PDTCH transmissions will collide (i.e., determination block 504="Yes"), the device processor may transmit the TCH transmissions for the first subscription and blank (i.e., not transmit) the PDTCH transmissions for the second subscription in block 508. In block 510, the device processor may increment the blanking counter. For example, the device processor may add a value equal to the number of PDTCH transmissions that were blanked in block 508 to a current value of the blanking counter.

In determination block 512, the device processor may determine whether the blanking counter is equal to or greater than a blanking threshold. In various embodiments, the blanking threshold may be a number of PDTCH transmissions that represents a maximum number of consecutive PDTCH transmissions that may be blanked before taking a corrective action, such as prioritizing the next PDTCH transmission over a next TCH transmission thereby sending a packet to the network. As an example, the blanking threshold may be 16 packets. In response to determining that the blanking counter is less than the blanking threshold (i.e., determination block 512="No"), the device processor may return to determining whether there will be a collision between the TCH transmissions of the first subscription and a next PDTCH transmission in determination block 504.

In response to determining that the blanking counter is equal to or greater than the blanking threshold (i.e., determination block 512="Yes"), the device processor may take an action to ensure the next PDTCH transmission on the second subscription is transmitted in block 514. For example, the device processor may momentarily prioritize the second subscription for the duration of the next PDTCH transmission so that the algorithm for allocating the transmission resource allocates the transmitter to the second subscription. The action may ensure that the next PDTCH transmission is transmitted regardless of whether the PDTCH transmission will collide with the TCH transmissions of the first subscription. Consequently, the next PDTCH transmission is sent from the mobile communication device to the network. Reception of that PDTCH transmission may cause the network to reset its counter for PDTCH transmissions, or otherwise recognize that the data call of the second subscription should be maintained.

In block 516, the device processor may determine a USF utilization rate. In various embodiments, the USF utilization rate may be determined based on the number of USFs allocated to the mobile communication device and the number of PDTCH transmissions transmitted from the mobile communication device. In block 518, the device processor may send the USF utilization rate to the RLC function. In block 520, the device processor may send the USF to the RR sublayer.

In block 522, the device processor may reset the blanking counter when a PDTCH transmission is sent to the network. The device processor may return to determining whether there is a collision between the TCH transmissions of the first subscription and a next PDTCH transmission in determination block 504.

FIG. 6 illustrates a method 600 for applying flow control to a data call based on a USF utilization rate according to various embodiments. The method 600 may be implemented with a processor (e.g., the general processor 206 of FIG. 2, the baseband modem processor 216, the collision management unit 230, a separate controller, and/or the like) of a multi-subscription-capable communication device (e.g., the mobile communication devices 110, 120, 200 described with reference to FIGS. 1-5). For example, the method 600 may be implemented by a RLC function (e.g., RLC function 410 of FIG. 4). In some embodiments, the operations of the method 600 may be implemented in conjunction with the operations of the method 500 of FIG. 5 and the method 700 of FIG. 7.

With references to FIGS. 1-6, the device processor may begin performing operations of the method 600 upon receiving a USF utilization rate (block 602), for example a USF utilization rate determined by a GERAN layer (e.g., GERAN layer 402 of FIG. 4). In determination block 604, the device processor may determine whether the USF utilization rate is greater than or equal to a radio link threshold. In response to determining that the USF utilization rate is less than the radio link threshold (i.e., determination block 604="No"), flow control may not be required and may not be applied to the data call in block 606. In response to determining that the USF utilization rate is greater than or equal to the radio link threshold (i.e., determination block 604="Yes"), flow control may be applied to the data call in block 608.

Figure 7:
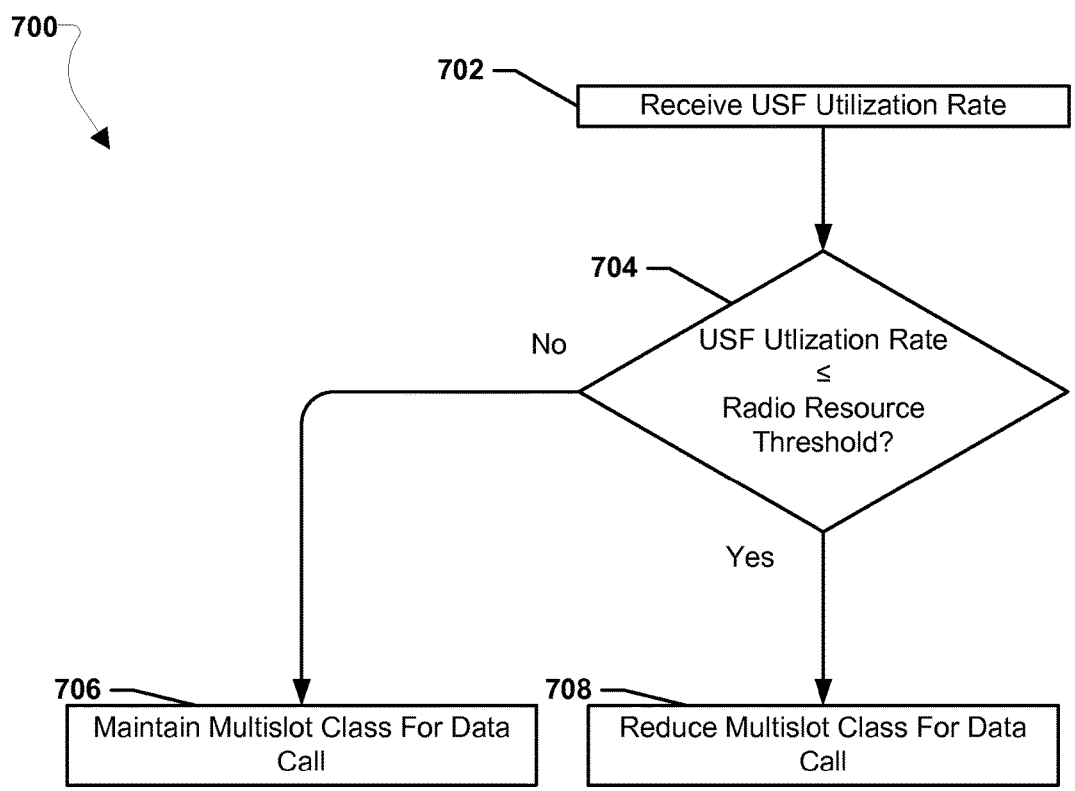
FIG. 7 is a process flow diagram illustrating a method for reducing a multislot class for a data call based on a USF utilization rate according to various embodiments.

FIG. 7 illustrates a method 700 for reducing a multislot class for a data call based on a USF utilization rate according to various embodiments. The method 700 may be implemented with a processor (e.g., the general processor 206 of FIG. 2, the baseband modem processor 216, the collision management unit 230, a separate controller, and/or the like) of a multi-subscription-capable communication device (e.g., the mobile communication devices 110, 120, 200 described with reference to FIGS. 1-6). For example, the method 700 may be implemented by a RR sublayer (e.g., RR sublayer 408 of FIG. 4). In some embodiments, the operations of the method 700 may be implemented in conjunction with the operations of the method 500 of FIG. 5 and method 600 of FIG. 6.

With references to FIGS. 1-7, the device processor may begin performing operations of the method 700 upon receiving a USF utilization rate (block 702), for example a USF utilization rate determined by a GERAN layer (e.g., GERAN layer 402 of FIG. 4). In determination block 704, the device processor may determine whether the USF utilization rate is less than or equal to a radio resource threshold. In response to determining that the USF utilization rate is greater than the radio link threshold (i.e., determination block 704="No"), the device processor may maintain the multislot class for the data call in block 706.

In response to determining that the USF utilization rate is less than or equal to the radio resource threshold (i.e., determination block 704="Yes"), the device processor may reduce the multislot class for the data call in block 708. For example, the RR sublayer may reduce the number of slots assigned to PDTCH transmissions from a normal amount, such as four slots, to a single slot (or other slot amount) transmit in response to the USF utilization rate being less than or equal to the radio resource threshold. The reduction of slots may improve radio resource usage because slots that would otherwise be unused during PDTCH transmission blanking may be released.

Figure 8:
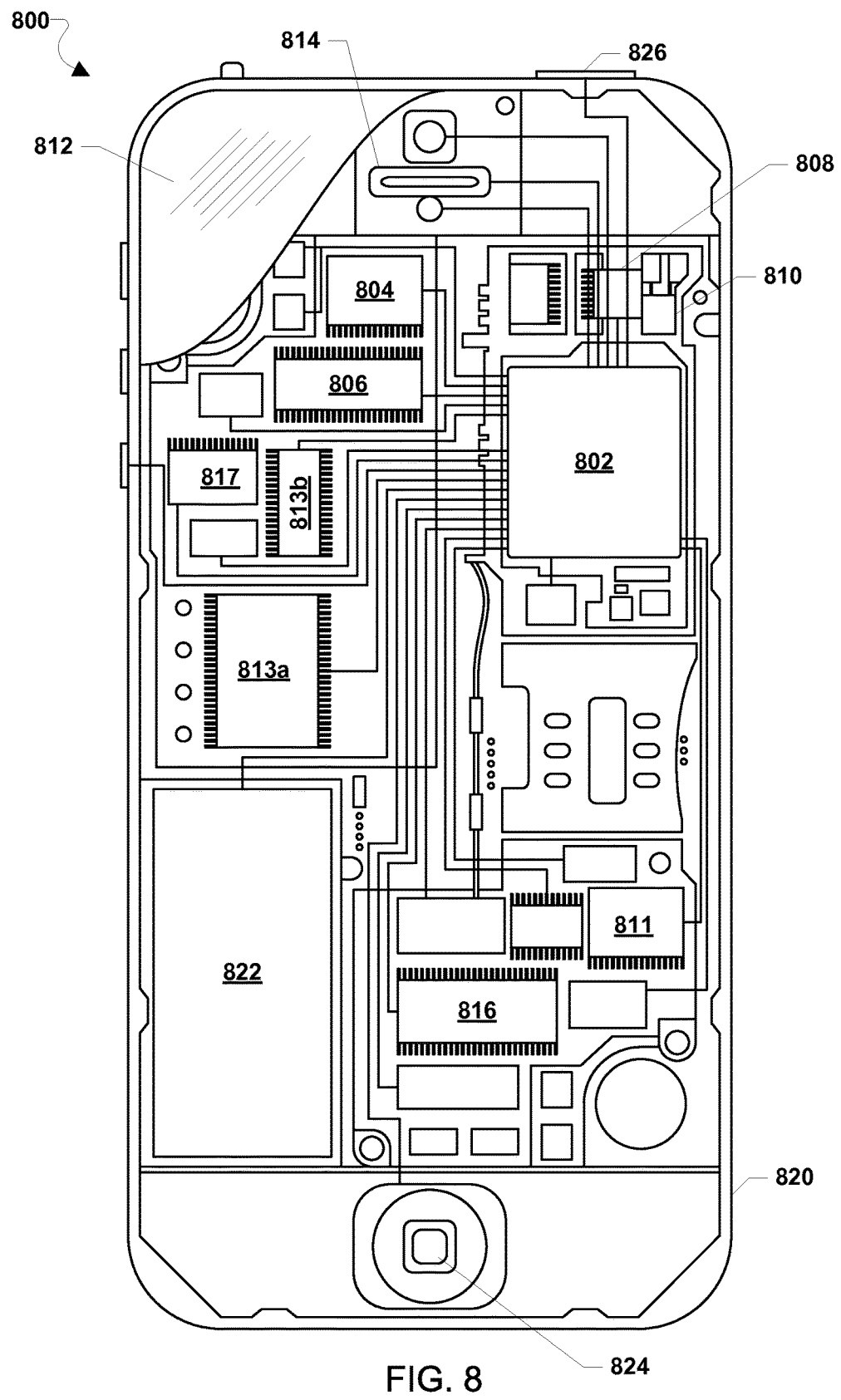
FIG. 8 is a component block diagram of a multi-subscription-capable, multi-SIM-multi-active communication device suitable for implementing some embodiment methods.

Various embodiments may be implemented in any of a variety of mobile communication devices, an example on which (e.g., mobile communication device 800) is illustrated in FIG. 8. According to various embodiments, the mobile communication device 800 may be similar to the mobile communication devices 100, 120, 200 as described with reference to FIGS. 1-7. As such, the mobile communication device 800 may implement the methods 400, 500, and/or 600 in FIGS. 5-7.

With reference to FIGS. 1-8, the mobile communication device 800 may include a processor 802 coupled to a touchscreen controller 1004 and an internal memory 806. The processor 802 may be one or more multi-core integrated circuits designated for general or specific processing tasks. The internal memory 806 may be volatile or non-volatile memory, and may be secure and/or encrypted memory, or unsecure and/or unencrypted memory, or any combination thereof. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the mobile communication device 800 need not have touch screen capability.

The mobile communication device 800 may have one or more cellular network transceivers 808, 816 coupled to the processor 802 and to two or more antennae 810, 811 and configured for sending and receiving cellular communications. The transceivers 808, 816 and the antennae 810, 811 may be used with the disclosed circuitry to implement the various embodiment methods. The mobile communication device 1000 may include two or more SIM cards (e.g., SIMs 813*a*, 813*b*) coupled to the transceivers 808, 816 and/or the processor 802 and configured as described. The mobile communication device 800 may include a cellular network wireless modem chip 817 that enables communication via a cellular network and is coupled to the processor 802.

The mobile communication device 800 may also include speakers 814 for providing audio outputs. The mobile communication device 800 may also include a housing 820, constructed of a plastic, metal, or a combination of materials, for containing all or some of the components discussed herein. The mobile communication device 800 may include a power source 822 coupled to the processor 802, such as a disposable or rechargeable battery. The rechargeable battery may also be coupled to the peripheral device connection port to receive a charging current from a source external to the mobile communication device 800. The mobile communication device 800 may also include a physical button 824 for receiving user inputs. The mobile communication device 800 may also include a power button 826 for turning the mobile communication device 800 on and off.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method implemented on a multi-subscription-capable communication device for maintaining a data connection during transmit (Tx) blanking, comprising:
   determining whether a traffic channel (TCH) transmission for a first subscription in a voice call will collide with a Packet Data Traffic Channel (PDTCH) transmission for a second subscription in a data call;
   transmitting the TCH transmission for the first subscription and blanking the PDTCH transmission in response to determining that the TCH transmission for the first subscription in the voice call will collide with the PDTCH transmission for the second subscription in the data call;
   incrementing a blanking counter in response to blanking the PDTCH transmission;
   determining whether the blanking counter is greater than or equal to a blanking threshold in response to incrementing the blanking counter; and
   transmitting a next PDTCH transmission for the second subscription in response to determining that the blanking counter is greater than or equal to the blanking threshold.

2. The method of claim 1, wherein transmitting a next PDTCH transmission for the second subscription in response to determining that the blanking counter is greater than or equal to the blanking threshold comprises momentarily increasing a priority assigned to the second subscription until the next PDTCH transmission is transmitted.

3. The method of claim 1, further comprising:
   determining an Uplink State Flag (USF) utilization rate in response to transmitting the next PDTCH transmission for the second subscription.

4. The method of claim 3, wherein determining an Uplink State Flag (USF) utilization rate in response to transmitting the next PDTCH transmission for the second subscription comprises determining the USF utilization rate based on a number of USFs allocated to the multi-subscription-capable communication device and a number of PDTCH transmissions transmitted from the multi-subscription-capable communication device.

5. The method of claim 4, further comprising:
   determining whether the USF utilization rate is greater than or equal to a radio link threshold; and
   applying flow control to the data call in response to determining that the USF utilization rate is greater than or equal to the radio link threshold.

6. The method of claim 4, further comprising:
   determining whether the USF utilization rate is less than or equal to a radio resource threshold; and
   reducing a multislot class for the data call in response to determining that the USF utilization rate is less than or equal to the radio resource threshold.

7. The method of claim 6, wherein reducing the multislot class for the data call comprises reducing the multislot class to a single slot transmit.

8. The method of claim 1, wherein the blanking threshold is equal to a maximum number of consecutive PDTCH transmissions that can be blanked before taking a corrective action.

9. The method of claim 8, wherein the corrective action is prioritizing the next PDTCH transmission over a next TCH transmission.

10. A multi-subscription-capable communication device, comprising:
    a processor coupled to a plurality of Subscriber Identity Modules (SIMs), wherein the processor is configured with processor-executable instructions to:
        determine whether a traffic channel (TCH) transmission for a first subscription in a voice call will collide with a Packet Data Traffic Channel (PDTCH) transmission for a second subscription in a data call;
        transmit the TCH transmission for the first subscription and blanking the PDTCH transmission in response to determining that the TCH transmission for the first subscription in the voice call will collide with the PDTCH transmission for the second subscription in the data call;
        increment a blanking counter in response to blanking the PDTCH transmission;
        determine whether the blanking counter is greater than or equal to a blanking threshold in response to incrementing the blanking counter; and
        transmit a next PDTCH transmission for the second subscription in response to determining that the blanking counter is greater than or equal to the blanking threshold.

11. The multi-subscription-capable communication device of claim 10, wherein the processor is further configured with processor-executable instructions to:
    transmit a next PDTCH transmission for the second subscription in response to determining that the blanking counter is greater than or equal to the blanking threshold by momentarily increasing a priority assigned to the second subscription until the next PDTCH transmission is transmitted.

12. The multi-subscription-capable communication device of claim 10, wherein the processor is further configured with processor-executable instructions to:
    determine an Uplink State Flag (USF) utilization rate in response to transmitting the next PDTCH transmission for the second subscription.

13. The multi-subscription-capable communication device of claim 12, wherein the processor is further configured with processor-executable instructions to:
    determine an Uplink State Flag (USF) utilization rate in response to transmitting the next PDTCH transmission for the second subscription based on a number of USFs allocated to the multi-subscription-capable communication device and a number of PDTCH transmissions transmitted from the multi-subscription-capable communication device.

14. The multi-subscription-capable communication device of claim 13, wherein the processor is further configured with processor-executable instructions to:
    determine whether the USF utilization rate is greater than or equal to a radio link threshold; and
    apply flow control to the data call in response to determining that the USF utilization rate is greater than or equal to the radio link threshold.

15. The multi-subscription-capable communication device of claim 13, wherein the processor is further configured with processor-executable instructions to:
- determine whether the USF utilization rate is less than or equal to a radio resource threshold; and
- reduce a multislot class for the data call in response to determining that the USF utilization rate is less than or equal to the radio resource threshold.

16. The multi-subscription-capable communication device of claim 15, wherein the processor is further configured with processor-executable instructions to reduce the multislot class for the data call by reducing the multislot class to a single slot transmit.

17. The multi-subscription-capable communication device of claim 10, wherein the blanking threshold is equal to a maximum number of consecutive PDTCH transmissions that can be blanked before taking a corrective action.

18. The multi-subscription-capable communication device of claim 17, wherein the corrective action is prioritizing the next PDTCH transmission over a next TCH transmission.

19. A multi-subscription-capable communication device, comprising:
- means for determining whether a traffic channel (TCH) transmission for a first subscription in a voice call will collide with a Packet Data Traffic Channel (PDTCH) transmission for a second subscription in a data call;
- means for transmitting the TCH transmission for the first subscription and blanking the PDTCH transmission in response to determining that the TCH transmission for the first subscription in the voice call will collide with the PDTCH transmission for the second subscription in the data call;
- means for incrementing a blanking counter in response to blanking the PDTCH transmission;
- means for determining whether the blanking counter is greater than or equal to a blanking threshold in response to incrementing the blanking counter; and
- means for transmitting a next PDTCH transmission for the second subscription in response to determining that the blanking counter is greater than or equal to the blanking threshold.

20. A non-transitory processor-readable storage medium having stored thereon processor-executable instructions configured to cause a processor of a multi-subscription-capable communication device to perform operations for maintaining a data connection during transmit (Tx) blanking comprising:
- determining whether a traffic channel (TCH) transmission for a first subscription in a voice call will collide with a Packet Data Traffic Channel (PDTCH) transmission for a second subscription in a data call;
- transmitting the TCH transmission for the first subscription and blanking the PDTCH transmission in response to determining that the TCH transmission for the first subscription in the voice call will collide with the PDTCH transmission for the second subscription in the data call;
- incrementing a blanking counter in response to blanking the PDTCH transmission;
- determining whether the blanking counter is greater than or equal to a blanking threshold in response to incrementing the blanking counter; and
- transmitting a next PDTCH transmission for the second subscription in response to determining that the blanking counter is greater than or equal to the blanking threshold.

21. The non-transitory processor-readable storage medium of claim 20, wherein the stored processor-executable instructions are configured to cause a processor of a multi-subscription-capable communication device to perform operations such that transmitting a next PDTCH transmission for the second subscription in response to determining that the blanking counter is greater than or equal to the blanking threshold comprises momentarily increasing a priority assigned to the second subscription until the next PDTCH transmission is transmitted.

22. The non-transitory processor-readable storage medium of claim 20, wherein the stored processor-executable instructions are configured to cause a processor of a multi-subscription-capable communication device to perform operations further comprising:
- determining an Uplink State Flag (USF) utilization rate in response to transmitting the next PDTCH transmission for the second subscription.

23. The non-transitory processor-readable storage medium of claim 20, wherein the stored processor-executable instructions are configured to cause a processor of a multi-subscription-capable communication device to perform operations such that determining an Uplink State Flag (USF) utilization rate in response to transmitting the next PDTCH transmission for the second subscription comprises determining the USF utilization rate based on a number of USFs allocated to the multi-subscription-capable communication device and a number of PDTCH transmissions transmitted from the multi-subscription-capable communication device.

24. The non-transitory processor-readable storage medium of claim 23, wherein the stored processor-executable instructions are configured to cause a processor of a multi-subscription-capable communication device to perform operations further comprising:
- determining whether the USF utilization rate is greater than or equal to a radio link threshold; and
- applying flow control to the data call in response to determining that the USF utilization rate is greater than or equal to the radio link threshold.

25. The non-transitory processor-readable storage medium of claim 23, wherein the stored processor-executable instructions are configured to cause a processor of a multi-subscription-capable communication device to perform operations further comprising:
- determining whether the USF utilization rate is less than or equal to a radio resource threshold; and
- reducing a multislot class for the data call in response to determining that the USF utilization rate is less than or equal to the radio resource threshold.

26. The non-transitory processor-readable storage medium of claim 25, wherein the stored processor-executable instructions are configured to cause a processor of a multi-subscription-capable communication device to perform operations such that reducing the multislot class for the data call comprises reducing the multislot class to a single slot transmit.

27. The non-transitory processor-readable storage medium of claim 20, wherein the stored processor-executable instructions are configured to cause a processor of a multi-subscription-capable communication device to perform operations such that the blanking threshold is equal to a maximum number of consecutive PDTCH transmissions that can be blanked before taking a corrective action.

28. The non-transitory processor-readable storage medium of claim 27, wherein the stored processor-executable instructions are configured to cause a processor of a multi-subscription-capable communication device to perform operations such that the corrective action is prioritizing the next PDTCH transmission over a next TCH transmission.

* * * * *